United States Patent
Ueda et al.

(10) Patent No.: US 9,245,424 B2
(45) Date of Patent: Jan. 26, 2016

(54) STORE SYSTEM AND SALES REGISTRATION METHOD

(75) Inventors: Hiroyuki Ueda, Shizuoka (JP); Masahito Sano, Shizuoka (JP); Nobuo Watanabe, Shizuoka (JP); Hiroyuki Koyama, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 317 days.

(21) Appl. No.: 13/214,368

(22) Filed: Aug. 22, 2011

(65) Prior Publication Data

US 2012/0047037 A1    Feb. 23, 2012

(30) Foreign Application Priority Data

Aug. 23, 2010 (JP) ................................ 2010-186527
Jul. 11, 2011 (JP) ................................ 2011-153244

(51) Int. Cl.
*G06Q 20/00* (2012.01)
*G06K 15/00* (2006.01)
*G06K 9/54* (2006.01)
*G06K 9/00* (2006.01)
*G07G 1/00* (2006.01)
*G06Q 30/06* (2012.01)
*G06T 1/20* (2006.01)
*G06Q 20/20* (2012.01)
*G06T 7/00* (2006.01)

(52) U.S. Cl.
CPC ................ *G07G 1/0054* (2013.01); *G06K 9/00* (2013.01); *G06Q 20/208* (2013.01); *G06Q 30/06* (2013.01); *G06T 1/20* (2013.01); *G06T 7/001* (2013.01); *G06K 2209/17* (2013.01); *G06T 2207/10024* (2013.01); *G06T 2207/30128* (2013.01)

(58) Field of Classification Search
None
See application file for complete search history.

(56) References Cited

U.S. PATENT DOCUMENTS 5,867,265 A    2/1999  Thomas
6,363,366 B1   3/2002  Henty
(Continued)

FOREIGN PATENT DOCUMENTS

EP    0 685 814 A2    12/1995
JP    04-238252    *   8/1992 ............. G01N 21/85
(Continued)

OTHER PUBLICATIONS

Extended European Search Report for European Application No. 11178137.3-1238 issued on Dec. 30, 2011.
(Continued)

*Primary Examiner* — Ryan Zeender
*Assistant Examiner* — Denisse Ortiz Roman
(74) *Attorney, Agent, or Firm* — Amin, Turocy & Watson, LLP (57) ABSTRACT

According to one embodiment, a store system includes: an image output section configured to output an image picked up by an image pickup section; an object recognizing section configured to recognize a specific object by reading a feature value of the output image; a similarity determining section configured to calculate similarity indicating to which degree the recognized object is similar to a reference image of the object determined in advance and determine whether the calculated similarity exceeds a threshold set in advance; and a defective informing section configured to inform, if the similarity determining section determines that the calculated similarity does not exceed the threshold set in advance, that the object is not recognized as a regular commodity.

13 Claims, 7 Drawing Sheets

(56) References Cited

U.S. PATENT DOCUMENTS

| | | |
|---|---|---|
| 6,658,138 B1 | 12/2003 | Gu et al. |
| 8,494,909 B2 * | 7/2013 | Goncalves ............... 705/22 |
| 2005/0027487 A1 * | 2/2005 | Iyer ............... 702/185 |
| 2005/0189412 A1 * | 9/2005 | Hudnut et al. ............... 235/383 |
| 2006/0227992 A1 | 10/2006 | Rathus |
| 2008/0249884 A1 * | 10/2008 | Knowles et al. ............... 705/23 |
| 2010/0086192 A1 * | 4/2010 | Grigsby et al. ............... 382/141 |
| 2011/0011936 A1 * | 1/2011 | Morandi et al. ............... 235/454 |
| 2011/0198400 A1 | 8/2011 | Sano |
| 2011/0216979 A1 * | 9/2011 | Barkol et al. ............... 382/218 |
| 2012/0047038 A1 | 2/2012 | Sano et al. |
| 2012/0047039 A1 | 2/2012 | Sano et al. |
| 2012/0047040 A1 | 2/2012 | Ueda et al. |
| 2012/0083685 A1 | 4/2012 | Rapoport et al. |

FOREIGN PATENT DOCUMENTS

| | | |
|---|---|---|
| JP | 05-019695 | 1/1993 |
| JP | 06-223271 | 8/1994 |
| JP | 07-152961 | 6/1995 |
| JP | 11-017400 | 1/1999 |
| JP | 2000-194940 | 7/2000 |
| JP | 2003-006740 | 1/2003 |
| JP | 2008-052431 | 3/2008 |
| WO | 97/46856 | 12/1997 |

OTHER PUBLICATIONS

Office Action for Chinese Patent Application No. 201110241316.6 Dated Aug. 22, 2013, 8 pgs.

Japanese Office Action for Japanese Application No. 2011-153244 mailed on Jul. 31, 2012.

* cited by examiner

<INFORMATION STORED IN PLU FILE>

COMMODITY: BANANA
PRICE: $0.00
THRESHOLD 0.50

THRESHOLD 0.50 OR HIGHER

THRESHOLD 0.50 OR LOWER

SIMILARITY: 0.717>
0.50 (THRESHOLD)

(a)  OK

SIMILARITY: 0.252<
0.50 (THRESHOLD)

STORE SYSTEM AND SALES REGISTRATION METHOD

CROSS-REFERENCE TO RELATED APPLICATIONS

This application is based upon and claims the benefit of priority from the prior Japanese Patent Applications No. 2010-186527, filed on Aug. 23, 2010 and No. 2011-153244, filed on Jul. 11, 2011; the entire contents of all of which are incorporated herein by reference.

FIELD

Embodiments described herein relate generally to a store system and a sales registration method.

BACKGROUND

In the past, in a supermarket or the like, a commodity code reading apparatus is used that picks up an image of a code symbol such as a barcode or a two-dimensional code (e.g., a QR code (registered trademark)) affixed to a commodity using a digital camera such as a CCD image sensor and detects and decodes the code symbol detected from the picked-up image to read a commodity code.

However, in the related art, the code symbol such as the barcode or the two-dimensional code has to be affixed to the commodity. Therefore, concerning perishable foods, buns, and the like, packages or the like are separately prepared and code symbols are affixed to the packages or a code symbol table is prepared.

DETAILED DESCRIPTION

In general, according to one embodiment, a store system includes: an image output section configured to output an image picked up by an image pickup section; an object recognizing section configured to recognize a specific object by reading a feature value of the output image; a similarity determining section configured to calculate similarity indicating to which degree the recognized object is similar to a reference image of the object determined in advance and determine whether the calculated similarity exceeds a threshold set in advance; and a defective informing section configured to inform, if the similarity determining section determines that the calculated similarity does not exceed the threshold set in advance, that the object is not recognized as a regular commodity.

A store system and a sales registration method according to this embodiment are explained below with reference to the accompanying drawings using a checkout system as an example. The store system is a checkout system (a POS system) or the like including a POS terminal configured to perform registration and settlement of commodities purchased in one transaction. This embodiment is an example of application to a checkout system installed in a store such as a supermarket or a bun and doughnut shop.

Figure 1:
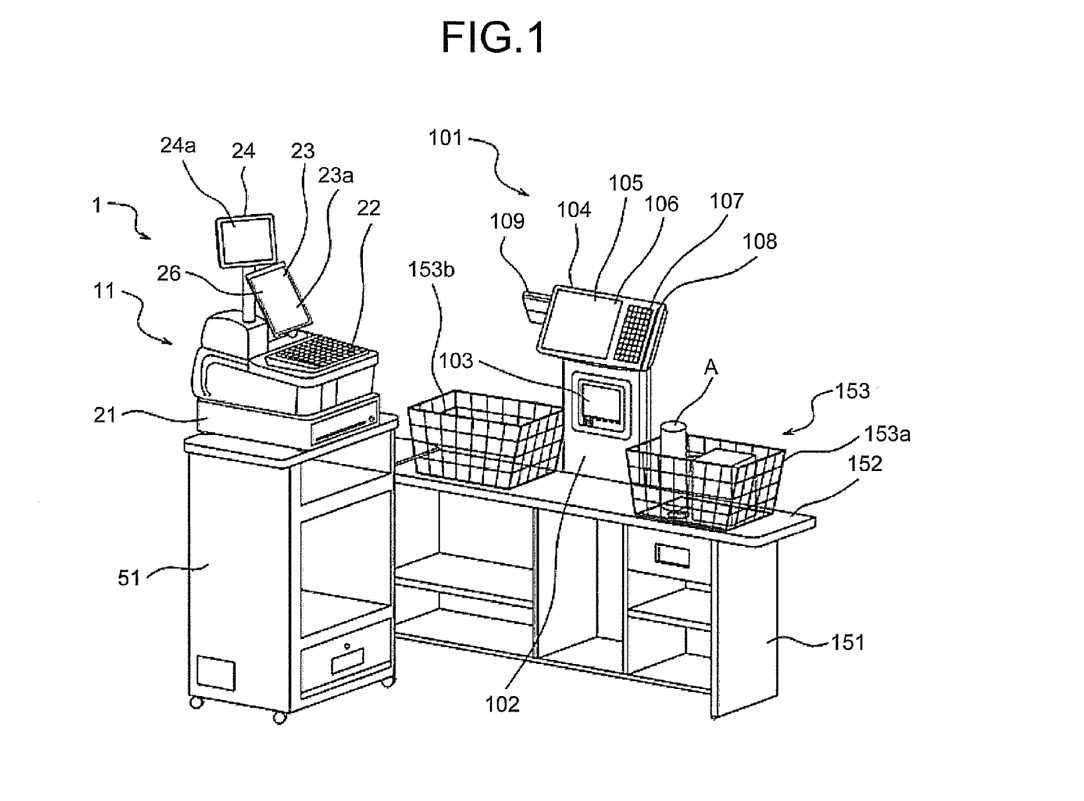
FIG. 1 is a perspective view of a checkout system according to an embodiment.

FIG. 1 is a perspective view of a checkout system 1. As shown in FIG. 1, the checkout system 1 includes a POS terminal configured to perform registration and settlement of commodities purchased in one transaction. The POS terminal 11 is placed on an upper surface of a drawer 21 on a checkout table 51. The drawer 21 is controlled to be opened by the POS terminal 11. A keyboard 22 pressed by an operator (a user) is arranged on an upper surface of the POS terminal 11. A display device 23 configured to display information to the operator is provided further on the depth side than the keyboard 22 viewed from the operator who operates the keyboard 22. The display device 23 displays information on a display surface 23a thereof. A touch panel 26 is laminated on the display surface 23a. A customer display device 24 is vertically provided to freely rotate further on the depth side than the display device 23. The customer display device 24 displays information on a display surface 24a thereof. In the customer display device 24 shown in FIG. 1, the display surface 24a is faced to the front side in FIG. 1. However, the customer display device 24 is rotated such that the display surface 24a faces the depth side in FIG. 1, whereby the customer display device 24 displays information to a customer.

A counter table 151 having a laterally long table shape is arranged to form an L shape with the checkout table 51 on which the POS terminal 11 is placed. A loading surface 152 is formed on an upper surface of the counter table 151. A shopping basket 153 that stores a commodity A is placed on the loading surface 152. The shopping basket 153 can be considered separately as a first shopping basket 153a carried in by the customer and a second shopping basket 153b located in a position across a commodity reading apparatus 101 from the first shopping basket 153a. The shopping basket 153 (the first shopping basket 153a) is not limited to a so-called basket-shaped object and may be a tray or the like used in a store such as a bakery. The shopping basket 153 (the second shopping basket 153b) is not limited to a so-called basket-shaped object and may be a paper box or the like used in a store such as a doughnut shop.

The commodity reading apparatus 101 connected to the POS terminal 11 to freely transmit and receive data to and from the POS terminal 11 is set on the loading surface 152 of the counter table 151. The commodity reading apparatus 101 includes a housing 102 having a thin rectangular shape. A reading window 103 is arranged in front of the housing 102. A display and operation section 104 is attached to an upper part of the housing 102. A display device 106, on a surface of which a touch panel 105 is laminated, is provided in the display and operation section 104. A keyboard 107 is disposed on the right of the display device 106. A card reading groove 108 of a not-shown card reader is provided on the right of the keyboard 107. A customer display device 109 for providing the customer with information is set on the left depth side on a rear surface of the display and operation section 104 viewed from the operator.

Figure 2:
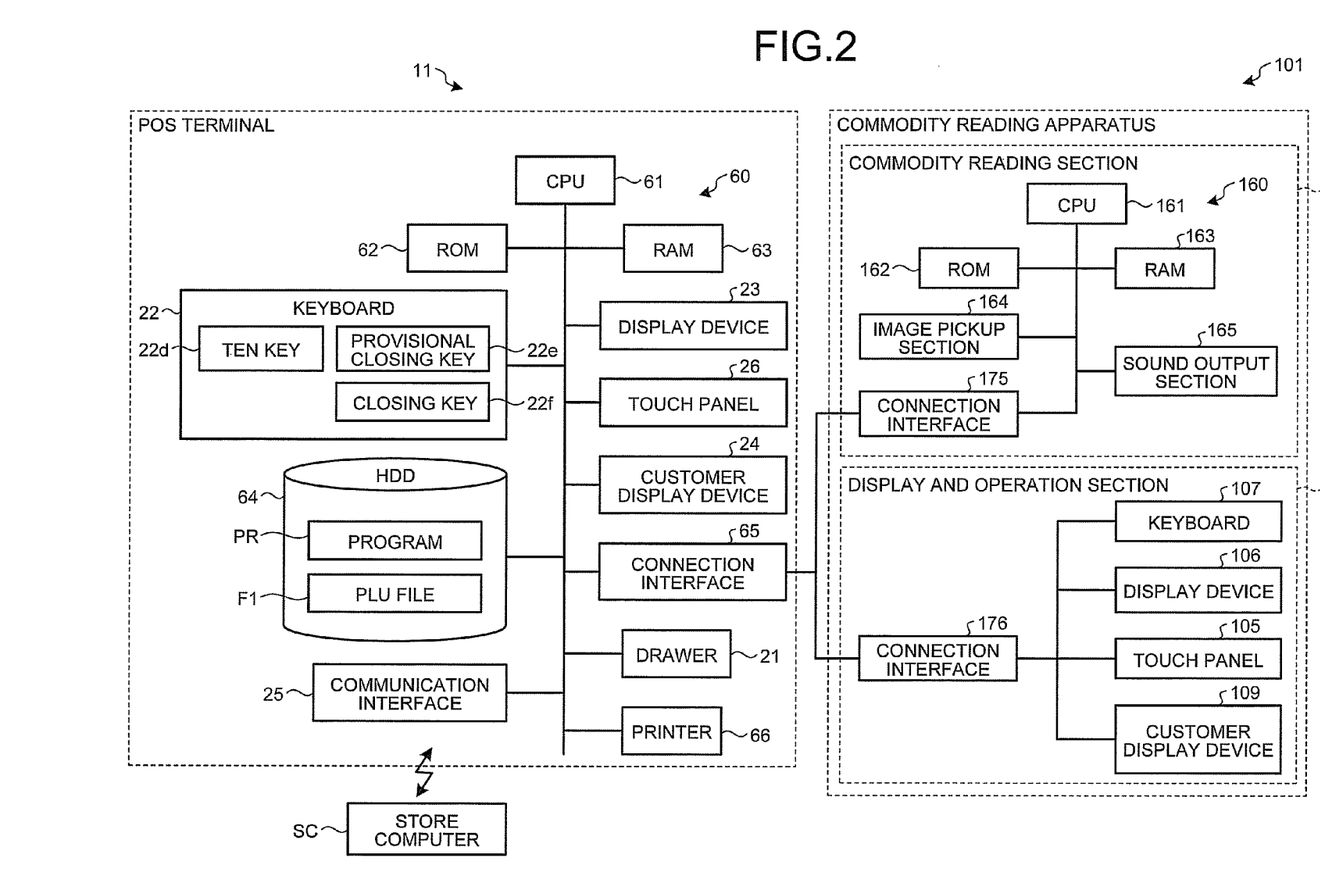
FIG. 2 is a block diagram of hardware configurations of a POS terminal and a commodity reading apparatus.

Such a commodity reading apparatus 101 includes a commodity reading section 110 (see FIG. 2). In the commodity reading section 110, an image pickup section 164 (see FIG. 2) is arranged on the depth side of the reading window 103.

Commodities A purchased in one transaction are stored in the first shopping basket 153a carried in by the customer. The commodities A are moved to the second shopping basket 153b by a hand of the operator. In a process of this movement, the commodities A are faced to the reading window 103 of the commodity reading apparatus 101. The image pickup section 164 (see FIG. 2) arranged on the depth side of the reading window 103 picks up images of the commodities A. The commodity reading apparatus 101 detects all or a part of the commodities A included in the images picked up by the image pickup section 164. If the commodity reading apparatus 101 detects that all or a part of the commodities A are included in the images picked up by the image pickup section 164, the commodity reading apparatus 101 outputs the picked-up images to the POS terminal 11. The POS terminal 11 recognizes, concerning each of the commodities A, referring to a PLU file F1 (details are explained later; see FIG. 3) in which information related to sales registration of the commodities A and images of the commodities A are associated, the commodity A as a specific object from the images of all or a part of the commodities A picked up by the image pickup section 164 of the commodity reading section 110 to specify the commodity A to be subjected to the sales registration. The POS terminal 11 records information related to the sales registration such as a commodity ID, a commodity classification, a commodity name, and a unit price of the specified commodity A in a sales master file (not shown) or the like and performs the sales registration.

FIG. 2 is a block diagram of hardware configurations of the POS terminal 11 and the commodity reading apparatus 101. The POS terminal 11 includes a microcomputer 60 functioning as an information processing section configured to execute information processing. The microcomputer 60 is configured by connecting, via a bus, a ROM (Read Only Memory) 62 and a RAM (Random Access Memory) 63 to a CPU (Central Processing Unit) 61 configured to execute various kinds of arithmetic processing and control sections.

All of the drawer 21, the keyboard 22, the display device 23, the touch panel 26, and the customer display device 24 are connected to the CPU 61 of the POS terminal 11 via various input and output circuits (all of which are not shown in the figure). These devices are controlled by the CPU 61.

The keyboard 22 includes a ten key 22d, on an upper surface of which numbers "1", "2", "3", and the like and a multiplication operator "×" are displayed, a provisional closing key 22e, and a closing key 22f.

A HDD (Hard Disk Drive) 64 is connected to the CPU 61 of the POS terminal 11. A computer program and various files are stored in the HDD 64. When the POS terminal 11 is started, all or a part of the computer program and the files stored in the HDD 64 are copied to the RAM 63 and sequentially executed by the CPU 61. An example of the computer program stored in the HDD 64 is a computer program PR for commodity sales data processing. An example of the files stored in the HDD 64 is the PLU file F1 distributed from a store computer SC and stored in the HDD 64.

Figure 3:
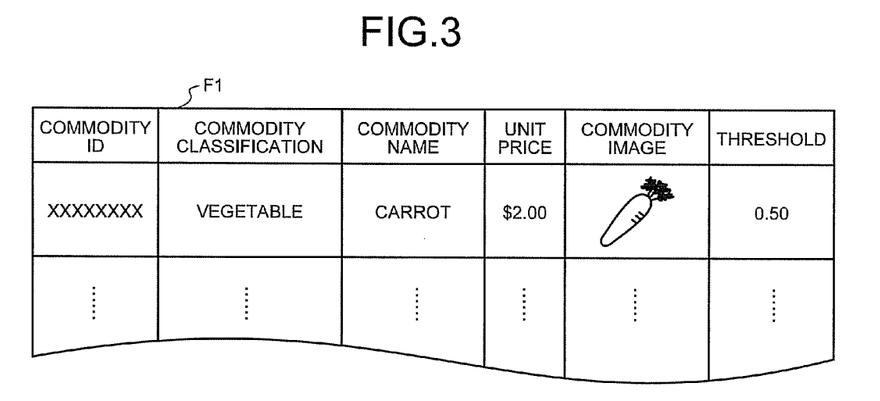
FIG. 3 is a conceptual diagram of a data structure of a PLU file.

The PLU file F1 is a file in which, concerning each of the commodities A displayed and sold in the store, association of information related to sales registration of the commodity A and an image of the commodity A is set. FIG. 3 is a conceptual diagram of a data structure of the PLU file F1. As shown in FIG. 3, the FLU file F1 is a file that stores, for each of the commodities A, information concerning the commodity A such as a commodity ID uniquely allocated to the commodity A, a commodity classification to which the commodity A belongs, a commodity name, and a unit price, a commodity image of the commodity A, and a threshold "similarity: 0.XX". As explained in detail later, for example, if the commodity A is a fruit, a perishable commodity, or the like and the freshness of the commodity A falls and is discolored, it is possible to determine that the commodity A is a commodity different from a regular state by comparing the threshold "similarity: 0.XX" with a commodity image of the commodity A stored in the PLU file F1 in advance.

Referring back to FIG. 2, a communication interface 25 for executing data communication with the store computer Sc is connected to the CPU 61 of the POS terminal 11 via an input and output circuit (not shown). The store computer SC is set in a backyard or the like of the store. The PLU file F1 to be distributed to the POS terminal 11 is stored in a HDD (not shown) of the store computer SC.

A connection interface 65 enabling data transmission and reception between the POS terminal 11 and the commodity reading apparatus 101 is connected to the CPU 61 of the POS terminal 11. The commodity reading apparatus 101 is connected to the connection interface 65. A printer 66 configured to perform printing on a receipt or the like is connected to the CPU 61 of the POS terminal 11. The POS terminal 11 prints transaction contents of one transaction on the receipt under the control by the CPU 61.

The commodity reading apparatus 101 includes a microcomputer 160. The microcomputer 160 is configured by connecting a ROM 162 and a RAM 163 to a CPU 161 via a bus. A computer program to be executed by the CPU 161 is stored in the ROM 162. The image pickup section 164 and a sound output section 165 are connected to the CPU 161 via various input and output circuits (all of which are not shown). The operations of the image pickup section 164 and the sound output section 165 are controlled by the CPU 161. The display and operation section 104 is connected to the POS terminal 11 via a connection interface 176. The operation of the display and operation section 104 is controlled by the CPU 61 of the POS terminal 11.

The image pickup section 164 is a color CCD image sensor, a color CMOS image sensor, or the like and serves as image pickup means for performing image pickup from the reading window 103 under the control by the CPU 161. For example, the image pickup section 164 performs image pickup of a 30 fps moving image. Frame images sequentially picked up by the image pickup section 164 at a predetermined frame rate are stored in the RAM 163.

The sound output section 165 is a sound circuit, a speaker, and the like for generating a warning sound or the like set in advance. The sound output section 165 performs alerting by sound such as the warning sound under the control by the CPU 161.

Further, a connection interface 175 connected to the connection interface 65 of the POS terminal 11 and enabling data transmission and reception between the commodity reading apparatus 101 and the POS terminal 11 is connected to the CPU 161. An image (an image including all or a part of the commodity A) picked up by the image pickup section 164 of the image reading apparatus 101 is output via the connection interface 175 and input to the POS terminal 11 via the connection interface 65 under the control by the CPU 161.

Figure 4:
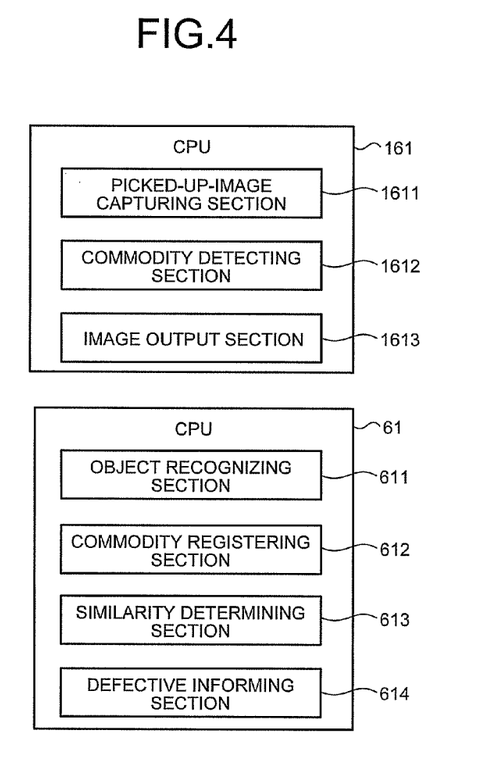
FIG. 4 is a block diagram of a functional configuration of a CPU.

Functional sections of the CPU 161 and the CPU 61 realized by the CPU 161 and the CPU 61 sequentially executing computer programs are explained with reference to FIG. 4. FIG. 4 is a block diagram of functional configurations of the CPU 161 and the CPU 61. As shown in FIG. 4, the CPU 161 sequentially executes the computer programs to thereby include functions of a picked-up-image capturing section 1611, a commodity detecting section 1612, and an image output section 1613 serving the image output means. Similarly, the CPU 61 includes functions of an object recognizing section 611 serving as object recognizing means, a commodity registering section 612, a similarity determining section 613 serving as similarity determining means, and a defective informing section 614 serving as defective informing means.

The picked-up-image capturing section 1611 output an image pickup ON signal to the image pickup section 164 and causes the image pickup section 164 to start an image pickup operation. The picked-up-image capturing section 1611 sequentially captures frame images picked up by the image pickup section 164 and stored in the RAM 163 after the start of the image pickup operation. The capturing of the frame images by the picked-up-image capturing section 1611 is performed in order of storage in the RAM 163.

The commodity detecting section 1612 detects, using a pattern matching technique or the like, all or a part of the commodity A included in the frame image captured by the picked-up-image capturing section 1611. Specifically, the commodity detecting section 1612 extracts a contour line or the like from an image obtained by binarizing the captured frame image. Subsequently, the commodity detecting section 1612 compares a contour line extracted from the latest frame image and a contour line extracted from the present frame image and detects a changed portion, i.e., reflection of a commodity faced to the reading window 103 for sales registration. As another method of detecting a commodity, the commodity detecting section 1612 detects presence or absence of a skin color area from the captured frame image. Subsequently, if a skin color area is detected, i.e., if reflection of a hand of the store clerk is detected, the commodity detecting section 1612 performs the detection of a contour line to attempt to extract a contour of a commodity assumed to be gripped by the hand of the store clerk. At this point, if a contour indicating the shape of the hand and other contours are detected, since the hand of the store clerk grips the commodity, the commodity detecting section 1612 detects reflection of the commodity.

The image output section 1613 outputs the frame image captured by the picked-up-image capturing section 1611 to the POS terminal 11 via the connection interface 175. The image output section 1613 may output the frame images captured by the picked-up-image capturing section 1611 to the POS terminal 11 one after another. However, in this embodiment, it is assumed that the image output section 1613 outputs a frame image in which all or a part of the commodity A is detected by the commodity detecting section 1612 to the POS terminal 11. Since the frame image in which all or a part of the commodity A is detected by the commodity detecting section 1612 is output to the POS terminal 11 in this way, it is possible to prevent the POS terminal 11 from performing object recognition executed by referring to the PLU file F1 using a frame image not including all or a part of the commodity A. Since recognition processing for a specific object requires processing time, it is possible to reduce the processing time by preventing processing on a frame image not including all or a part of the commodity A in which recognition of a specific object is not expected.

The object recognizing section 611 recognizes, referring to commodity images of the PLU file F1, the commodity A as a specific object by reading a state of a tint and a state of a surface of the commodity A such as an unevenness state of the surface as feature values from an image of all or a part of the commodity A picked up by the image pickup section 164 of the commodity reading apparatus 101. To realize a reduction in the processing time, the object recognizing section 611 does not take into account the contour and the size of the commodity A. The POS terminal 11 can specify, according to a recognition result of the object recognizing section 611, a commodity read by the commodity reading apparatus 101 out of commodities registered in the PLU file F1 in advance.

The similarity determining section 613 calculates similarity concerning the commodity A recognized by the object recognizing section 611 and determines whether the similarity exceeds a threshold set in advance in the PLU file F1.

Recognizing an object included in an image in this way is called generic object recognition. Concerning such generic object recognition, various recognition techniques are explained in a document described below.

Keiji Yanai, "The Present Situation and The Future of Generic Object Recognition", The Institute of Electronics, Information and Communication Engineers Transaction, Vol. 48, No. SIG 16 [retrieved on Aug. 10, 2010], Internet <URL: http://mm.cs.uec.ac.jp/IPSJ-TCVIM-Yanai.pdf>

A technique for performing the generic object recognition by dividing an area of an image for each object is explained in a document described below.

Jamie Shotton, et al., "Semantic Texton Forests for Image Categorization and Segmentation", [retrieved on Aug. 10, 2010], Internet <URL: http://citeseerx.ist.psu.edu/viewdoc/download?doi=10.1.1.145.3036&rep=rep1&type=dpf>

The commodity registering section 612 records, in a sales master file or the like, information related to sales registration related to a commodity image recognized by the object recognizing section 611, i.e., a commodity ID, a commodity classification, a commodity name, a unit price, and the like of a commodity specified as the commodity read by the commodity reading apparatus 101 and performs the sales registration.

Figure 5:
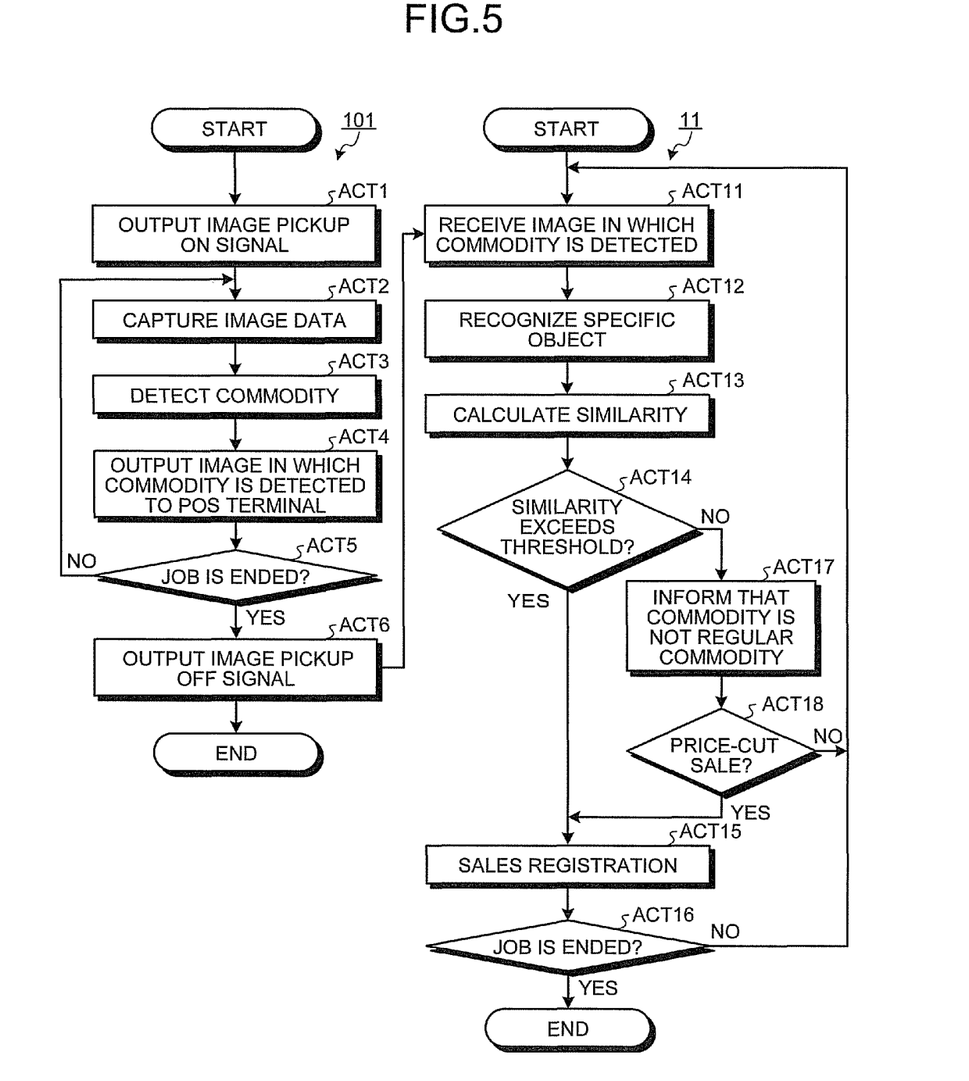
FIG. 5 is a flowchart for explaining an example of processing operations of the checkout system.

The operations of the checkout system 1 are explained in detail. FIG. 5 is a flowchart for explaining an example of the operations of the checkout system 1 according to this embodiment.

First, the operations on the commodity reading apparatus 101 side are explained. As shown in FIG. 5, when processing is started according to, for example, the start of commodity registration by the POS terminal 11, the picked-up-image capturing section 1611 outputs an image pickup ON signal to the image pickup section 164 and starts image pickup by the image pickup section 164 (Act 1). Subsequently, the picked-up-image capturing section 1611 captures a frame image (a picked-up image) picked up by the image pickup section 164 and stored in the RAM 163 (Act 2). Subsequently, the commodity detecting section 1612 detects all or a part of the commodity A from the frame image captured by the picked-up-image capturing section 1611 (Act 3). The image output section 1613 outputs the frame image in which all or a part the commodity A is detected by the commodity detecting section 1612 to the POS terminal 11 (Act 4).

Figure 6:
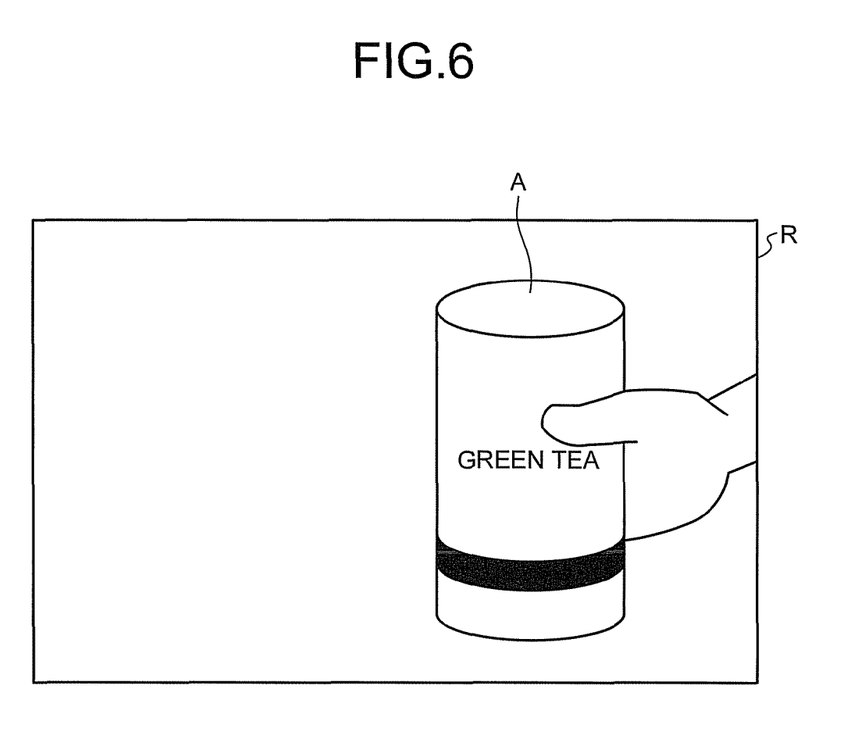
FIG. 6 is a conceptual diagram of an example of a reading area in a reading window.

FIG. 6 is a conceptual diagram of an example of a reading area R in the reading window 103. Specifically, FIG. 6 is a conceptual diagram of the reading area R in reading the commodities A. As shown in FIG. 6, if the commodity A is reflected in the reading area R in the moving process of the commodity A, in Act 3, all or a part of the commodity A is detected from a frame image obtained by picking up an image of the reading area R. According to the detection of all or a part of the commodity A, in Act 4, the frame image obtained by picking up the image of the reading area R is output to the POS terminal 11.

Subsequently, the CPU 161 determines presence or absence of a job end due to, for example, an end notification of the commodity registration from the POS terminal 11 (Act 5). If the job is continued (No in Act 5), the CPU 161 returns Act 2 and continues the processing. If the job is ended (Yes in Act 5), the picked-up-image capturing section 1611 outputs an image pickup OFF signal to the image pickup section 164, ends the image pickup by the image pickup section 164 (Act 6), and ends the processing.

The operations on the POS terminal 11 side are explained. As shown in FIG. 5, when processing is started according to, for example, the start of commodity registration by an instruction through operation of the keyboard 22, the CPU 61 receives the frame image in which all or a part of the commodity A is detected output from the commodity reading apparatus 101 (Act 11). Subsequently, the object recognizing section 611 recognizes, referring to the commodity images of the PLU file F1, the commodity A as a specific object from the image of all or a part of the commodity A output from the commodity reading apparatus 101 (Act 12).

Subsequently, the similarity determining section 613 calculates similarity concerning the commodity A recognized by the object recognizing section 611 (Act 13). If the similarity of the commodity images of the commodities stored in the PLU file F1 is 100%="similarity: 1.0", the similarity indicates to which degree images of all or a part of the commodity output from the commodity reading apparatus 101 are similar. As explained above, the similarity is calculated according to a state of a surface of the commodity A such as a tint and an unevenness state of the surface. For example, weighting may be changed for the tint and for the unevenness state of the surface.

The similarity determining section 613 determines whether the similarity calculated in Act 13 exceeds the threshold ("similarity: 0.XX") set in advance (Act 14).

If the similarity determining section 613 determines that the similarity calculated in Act 13 exceeds the threshold ("similarity: 0.XX") set in advance (Yes in Act 14), in Act 15, the commodity registering section 612 registers a recognition result of the commodities A as specific objects and sales of one commodity A selected out of the recognition result and specified.

Subsequently, the CPU 61 determines whether a job is ended according to, for example, the end of the sales registration by the instruction through operation of the keyboard 22 (Act 16). If the job is continued (NO in Act 16), the CPU 61 returns the processing to Act 11 and continues the processing. If the job is ended (Yes in Act 16), the CPU 61 ends the processing.

On the other hand, if the similarity determining section 613 determines that the similarity calculated in Act 13 does not exceed the threshold ("similarity: 0.XX") set in advance (No in Act 14), the defective informing section 614 informs the store clerk that the commodity A is a commodity not recognized as a regular commodity (Act 17) and urges the store side to take measures such as stop of sale or price-cut sale. Specifically, the defective informing section 614 informs the store clerk of an error, for example, through screen display on the display device 23 or on the display device 106 via the connection interfaces 65 and 176 or through the output of warning sound by the sound output section 165 via the connection interfaces 65 and 175. By informing the error in this way, the checkout system 1 can urge the store clerk to perform appropriate operation such as reading of another commodity A.

If the CPU 61 determines that price-cut sale is instructed by, for example, an instruction through operation of the keyboard 22 (Yes in Act 18), in Act 15, the commodity registering section 612 registers a recognition result of the commodities A as specific objects and registers, at a cut price, sales of one commodity A selected out of the recognition result and specified. If the CPU 61 determines that stop of sale is instructed by, for example, an instruction through operation of the keyboard 22 (No in Act 18), the CPU 61 returns the processing to Act 11.

Figure 7:
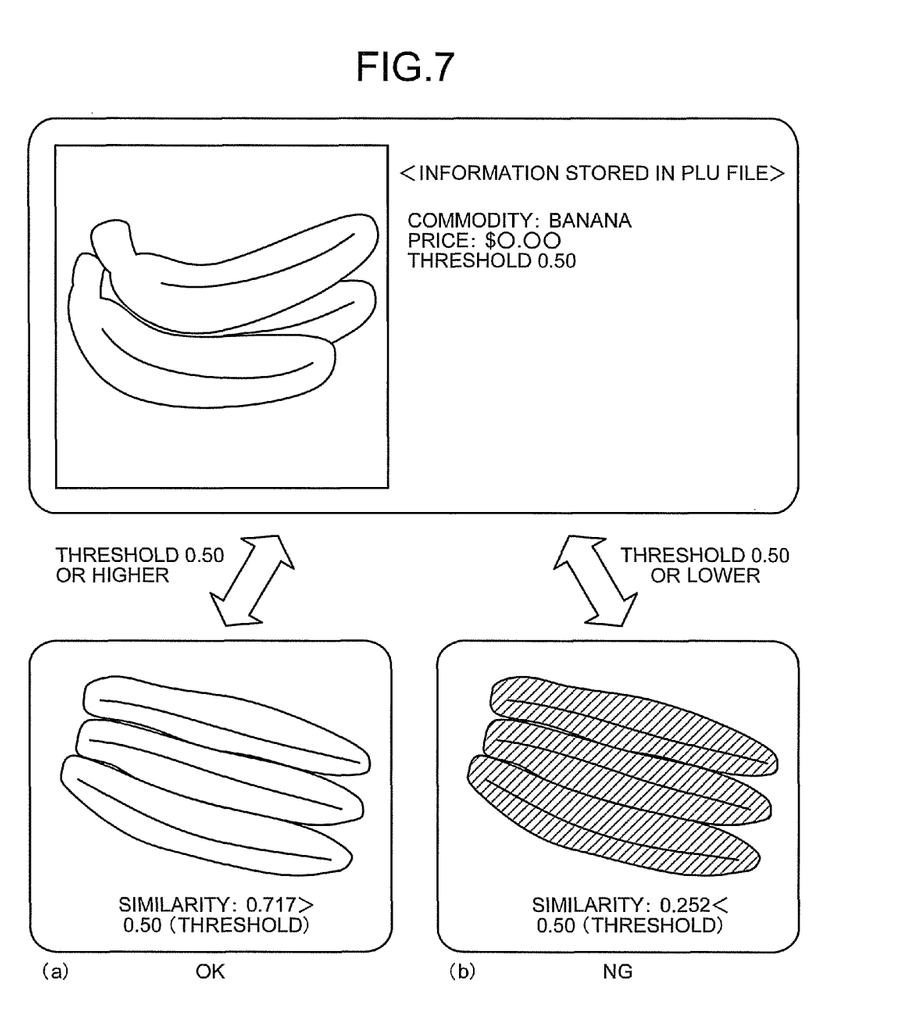
FIG. 7 is a schematic explanatory diagram of a specific example of processing.

As shown in FIG. 7, if the commodity A recognized by the object recognizing section 611 is "banana", if a threshold is stored in the PLU file F1 as "similarity: 0.50", since similarity is 0.717 concerning a commodity indicated by (a), it is determined that the calculated similarity exceeds the threshold set in advance. On the other hand, since similarity is 0.252 concerning a commodity indicated by (b), it is determined that the calculated similarity does not exceed the threshold set in advance. Therefore, the commodity indicated by (a) is subjected to sales registration as "banana" as usual. On the other hand, the commodity indicated by (b) is tentatively recognized as "banana". However, the commodity is regarded as a defective commodity aged and discolored, damaged, or deformed, i.e., a defective commodity having an abnormal tint, unevenness state of the surface, or the like, and is not subjected to sales registration. Similarly, concerning a daily dish or the like, commodity images based on a regular baked state and a regular fried state are stored in the PLU file F1. If insufficient or excess baking or insufficient or excess frying deviates from a threshold, it can be determined that the commodity is a defective.

Figure 8:
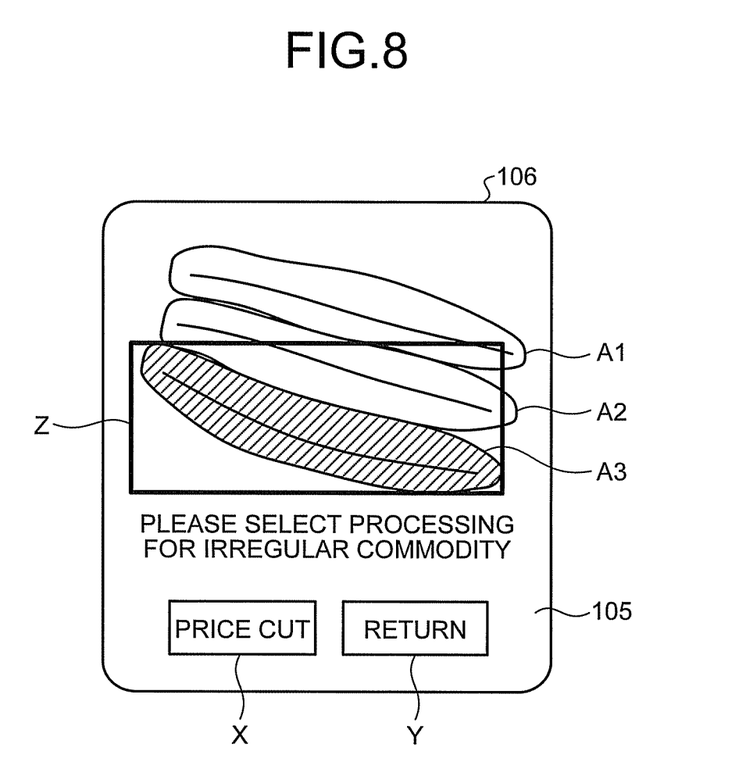
FIG. 8 is a front view of a display example of a commodity not recognized as a regular commodity.

In the recognition result of the object recognizing section 611, if the object recognizing section 611 recognizes plural (three) commodities A1 to A3 "banana", since the similarity of the commodities A1 and A2 is 0.717, it could be determined that the calculated similarity exceeds the threshold (0.50) set in advance. Since the similarity of the commodity A3 is 0.252, it could be determined that the calculated similarity does not exceed the threshold (0.50) set in advance. In such a case, as shown in FIG. 8, the defective informing section 614 displays the commodity A3, which is not recognized as a regular commodity because the similarity does not exceed the threshold (0.50), by, for example, surrounding the commodity A3 with a line Z in the display device 106. In this way, the defective informing section 614 distinguishes the commodity A3, the similarity of which does not exceeds the threshold, from the other commodities A1 and A2, the similarity of which exceeds the threshold, among the recognized plural commodities A1 to A3 and informs the store clerk that the commodity A3 is not recognized as the regular commodity. As shown in FIG. 8, the defective informing section 614 displays, on the display device 106, keys X and Y for selecting processing for a commodity not recognized as a regular commodity. In an example shown in FIG. 8, the key X is a key for instructing price-cut sale concerning the commodity not recognized as the regular commodity. The key Y is a key for instructing stop of sale concerning the commodity not recognized as the regular commodity.

If the CPU 61 determines that price-cut sale concerning the commodity A3 is instructed through operation of the key X via the touch panel 105 of the display device 106 (Yes in Act 18), in Act 15, the commodity registering section 612 registers sales of the commodity A3 in a cut price. If the CPU 61 determines that stop of sale of the commodity A3 is instructed through operation of the key Y via the touch panel 105 of the display device 106 (No in Act 18), the CPU 61 returns the processing to Act 11.

A price-cut ratio or a price-cut amount used in selling a commodity not recognized as a regular commodity at a cut price may be set stepwise. The price-cut ratio or the price-cut amount can be provided stepwise according to similarity, for example, by associating the price-cut ratio or the price-cut amount with plural thresholds (similarity: 0.XX) stored in the PLU file F1 in advance. A value of the threshold corresponding to the price-cut ratio or the price-cut amount may be set in a predetermined range. For example, a commodity having a threshold (similarity) of 0.30 to 0.50 is sold at a price-cut ratio of 20% and a commodity having a threshold (similarity) of 0.50 to 0.60 is sold at a price-cut ratio of 10%.

In this way, with the checkout system 1 according to this embodiment, if a perishable commodity, a daily dish, or the like is a commodity aged and discolored, damaged, or deformed or a commodity having a different tint because of a cooking failure, it is possible to determine that a commodity deviating from a standard is a defective by comparing the commodity with the commodity images stored in the PLU file F1.

In particular, for example, in a store where there is a limit in time for checking freshness of commodities such as a busy store or a store where a large number of employees are employed and there is an individual difference in cooking of daily dishes, it is possible to compare a commodity with a regular commodity according to numerical determination.

In this embodiment, an object to be recognized is a sales commodity stored in the PLU file F1. However, the object to be recognized is not limited to this and may be a sales promotion commodity or the like used for sales promotion.

The computer programs executed in the POS terminal 11 and the commodity reading apparatus 101 according to this embodiment are provided while being incorporated in a ROM or the like in advance. The computer programs executed in the POS terminal 11 and the commodity reading apparatus 101 according to this embodiment may be configured to be provided while being recorded in a computer-readable recording medium such as a CD-ROM, a flexible disk (FD), a CD-R, or a DVD (Digital Versatile Disk) as a file of an installable format or an executable format.

Further, the computer programs executed in the POS terminal 11 and the commodity reading apparatus 101 according to this embodiment may be configured to be provided while being stored on a computer connected to a network such as the Internet and downloaded through the network. The computer programs executed in the POS terminal 11 and the commodity reading apparatus 101 according to this embodiment may be configured to be provided or distributed through the network such as the Internet.

The computer program executed in the POS terminal 11 according to this embodiment has a module configuration including the sections explained above (the object recognizing section 611, the commodity registering section 612, the similarity determining section 613, and the defective informing section 614). As actual hardware, a CPU (a processor) reads out the computer program from the ROM and executes the computer program, whereby the sections are loaded onto a main storage and the object recognizing section 611, the commodity registering section 612, the similarity determining section 613, and the defective informing section 614 are generated on the main storage.

The computer program executed in the commodity reading apparatus 101 according to this embodiment has a module configuration including the sections explained above (the picked-up-image capturing section 1611, the commodity detecting section 1612, and the image output section 1613). As actual hardware, a CPU (a processor) reads out the computer program from the ROM and executes the computer program, whereby the sections are loaded onto a main storage and the picked-up-image capturing section 1611, the commodity detecting section 1612, and the image output section 1613 are generated on the main storage.

In this embodiment, the object recognizing section 611, the commodity registering section 612, the similarity determining section 613, and the defective informing section 614 are provided on the POS terminal 11 side. However, the present invention is not limited to this. The object recognizing section 611, the commodity registering section 612, the similarity determining section 613, and the defective informing section 614 may be provided on the commodity reading apparatus 101 side. In this case, the commodity reading apparatus 101 is the store system.

In this embodiment, the picked-up-image capturing section 1611, the commodity detecting section 1612, and the image output section 1613 are provided on the commodity reading apparatus 101 side. However, the present invention is not limited to this. The picked-up-image capturing section 1611, the commodity detecting section 1612, and the image output section 1613 may be provided on the POS terminal 11 side. In this case, the POS terminal 11 is the store system.

The picked-up-image capturing section 1611, the commodity detecting section 1612, and the image output section 1613 may be provided on the commodity reading apparatus 101 side and the sales registration performed in the POS terminal 11 may be performed on the commodity reading apparatus 101 side.

In the embodiment, the CPU 61 determines in Act 18 whether stop of sale is instructed through, for example, operation of the keyboard 22. However, the present invention is not limited to this. Price-cut processing and sale stop processing may be directly executed according to an object recognition result. For example, if a commodity is not recognized as a regular commodity, even if price-cut sale is not instructed through, for example, operation of the keyboard 22, the CPU 61 decides a price-cut amount according to the object recognition result and executes the price-cut processing (or executes the sale stop processing according to the object recognition result).

Further effects and modifications can be easily derived by those skilled in the art. Therefore, a wider form of the present invention is not limited to the specific details and the representative embodiment represented and described above. Therefore, various changes are possible without departing from the spirit and the scope of the general concept of the invention defined by the appended claims and equivalents of the claims.

What is claimed is:

1. A store system comprising:
an image output section comprising at least one processor and configured to output an image captured by an image pickup section;
an object recognizing section configured to recognize a plurality of objects which are commodities of a same kind by reading a feature value of the image;
a similarity determining section configured to calculate a similarity value indicating a degree to which an object, of the plurality of objects which are commodities of the same kind, is similar to a reference image of the object determined in advance and determine whether the similarity value exceeds a threshold value set in advance; and
a defective informing section configured to inform, in response to the similarity determining section determining that the similarity value does not exceed the threshold value, that the object is not recognized as a regular commodity, wherein in response to the similarity determining section determining that the similarity value of the object does not exceed the threshold value, the defective informing section modifies the image to graphically distinguish the object, the similarity value of which does not exceed the threshold value, from other objects of the plurality of objects which are commodities of the same kind having similarity values that exceed the threshold value, and informs that the object is not recognized as the regular commodity.

2. The system according to claim 1, wherein the similarity determining section is further configured to calculate the similarity value according to a state of a surface of the object using the state of the surface of the object as the feature value of the image.

3. The system according to claim 1, wherein the similarity determining section is further configured to determine the similarity value of the object based on the threshold value set for the object.

4. The system according to claim 1, further comprising a commodity registering unit configured to register, in response to the defective informing section informing that the object is not recognized as the regular commodity, sales of the object not recognized as the regular commodity at a reduced price.

5. The system according to claim 4, wherein the commodity registering section is further configured to associate a price-cut ratio or a price-cut amount used in cutting a price of sales of the object not recognized as the regular commodity with a plurality of threshold values to thereby provide the price-cut ratio or the price-cut amount in a stepwise manner.

6. The system according to claim 1, further comprising a commodity registering section configured to register, in response to a price-cut sale being instructed in response to the defective informing section informing that the object is not recognized as the regular commodity, sales of the object not recognized as the regular commodity at a reduced price.

7. The system according to claim 1, further comprising a commodity registering section configured to stop, in response to the defective informing section informing that the object is not recognized as the regular commodity, sale of the object not recognized as the regular commodity.

8. The system according to claim 1, further comprising a commodity registering section configured to stop, in response to a stop of sale being instructed in response to the defective informing section informing that the object is not recognized as the regular commodity, sale of the object not recognized as the regular commodity.

9. The store system of claim 1, wherein the defective informing section graphically distinguishes the object from the other objects by surrounding the object with a line on a display device.

10. A store system comprising:
an image pickup section comprising at least one processor;
an image output section configured to output an image captured by the image pickup section;
an object recognizing section configured to recognize a plurality of objects which are commodities of a same kind in the image by reading a feature value of the image;
a similarity determining section configured to calculate a similarity indicating a degree to which an object, of the plurality of objects which are commodities of the same kind, is similar to a reference image of the object determined in advance and determine whether the similarity exceeds a threshold set in advance; and
a defective informing section configured to inform, in response to the similarity determining section determining that the similarity does not exceed the threshold, that the object is not recognized as a regular commodity, wherein
in response to the similarity determining section determining that the similarity of the object does not exceed the threshold, the defective informing section modifies the image to graphically distinguish the object, the similarity of which does not exceed the threshold, from other objects of the plurality of objects which are commodities of the same kind having similarities that exceed the threshold, and informs that the object is not recognized as the regular commodity.

11. A sales registering method comprising:
recognizing, by a system comprising a processor, a plurality of objects which are commodities of a same kind in an image picked up by an image pickup section by reading a feature value of the image;
calculating a similarity value concerning an object, of the plurality of objects which are commodities of the same kind, and determining whether the similarity value exceeds a threshold value set in advance; and
informing, in response to a determination that the similarity value does not exceed the threshold value, that the object is not recognized as a regular commodity, wherein
in response to determining that the similarity value of the object does not exceed the threshold value, the informing comprises modifying the image to graphically distinguish the object, the similarity value of which does not exceed the threshold value, from other objects of the plurality of objects which are commodities of the same kind having respective similarity values that exceed the threshold value, and informing that the object is not recognized as the regular commodity.

12. The method according to claim 11, wherein the calculating the similarity value comprises calculating the similarity value according to a state of a surface of the object using the state of the surface of the object as the feature value of the image.

13. The method according to claim 11, wherein the determining the similarity value comprises determining the similarity value of the object based on the threshold value set for the object.

* * * * *